United States Patent [19]
Woloveke et al.

[11] 3,984,010
[45] Oct. 5, 1976

[54] TRUSS STACKING APPARATUS

[75] Inventors: Eugene L. Woloveke, Danville; Marvin M. Thompson, Alameda, both of Calif.

[73] Assignee: Boise Cascade Corporation, Boise, Idaho

[22] Filed: Sept. 15, 1975

[21] Appl. No.: 613,200

[52] U.S. Cl. ................................. 214/7; 198/598; 214/6.5
[51] Int. Cl.² ........................................ B65G 57/28
[58] Field of Search .................... 214/6 S, 6.5, 7, 8; 198/21, 29; 271/181, 234, 236, 238, 250, 251, 253

[56] References Cited
UNITED STATES PATENTS

| | | | |
|---|---|---|---|
| 1,014,269 | 1/1912 | Tichborne | 271/253 X |
| 3,389,812 | 6/1968 | Jureit et al. | 214/7 |
| 3,410,425 | 11/1968 | Guillaume | 214/7 |
| 3,437,216 | 4/1969 | McGlinchey | 214/7 |
| 3,517,834 | 6/1970 | Adams | 214/7 |
| 3,679,076 | 7/1972 | Miller et al. | 214/7 X |
| 3,811,578 | 5/1974 | Jureit et al. | 214/7 |
| 3,908,980 | 9/1975 | Fowler | 271/236 X |

Primary Examiner—L. J. Paperner
Attorney, Agent, or Firm—Lawrence E. Laubscher

[57] ABSTRACT

A truss stacking apparatus is disclosed which includes means for lifting successive horizontally disposed trusses off of a conveyor and for stacking the trusses in a generally upright orientation on a stacking skid. Guide means are disposed in the conveyor path for contacting the angularly arranged top chords of successive trusses to effect lateral shifting of the trusses toward lifting positions in which the trusses are lifted from the conveyor onto the skid.

6 Claims, 9 Drawing Figures

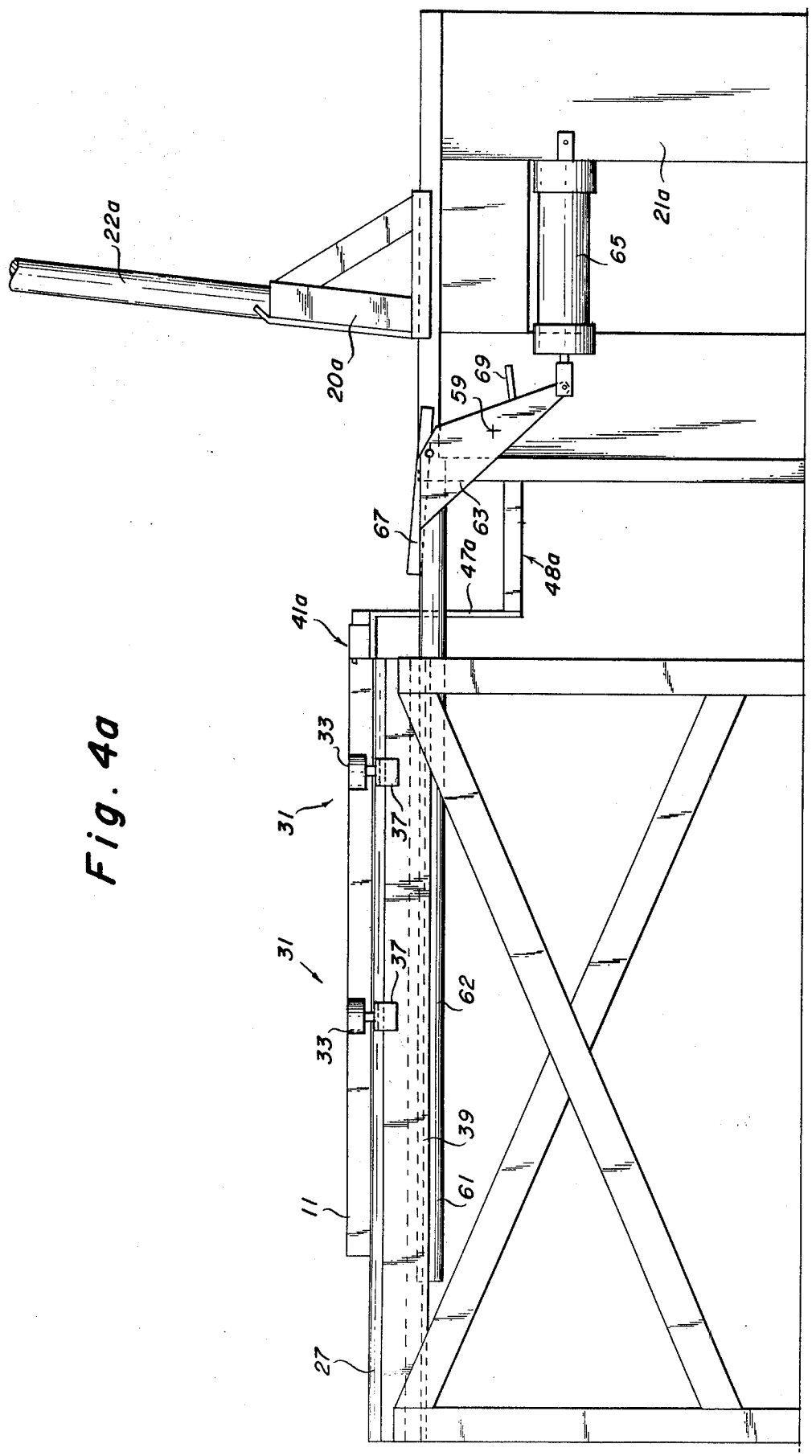

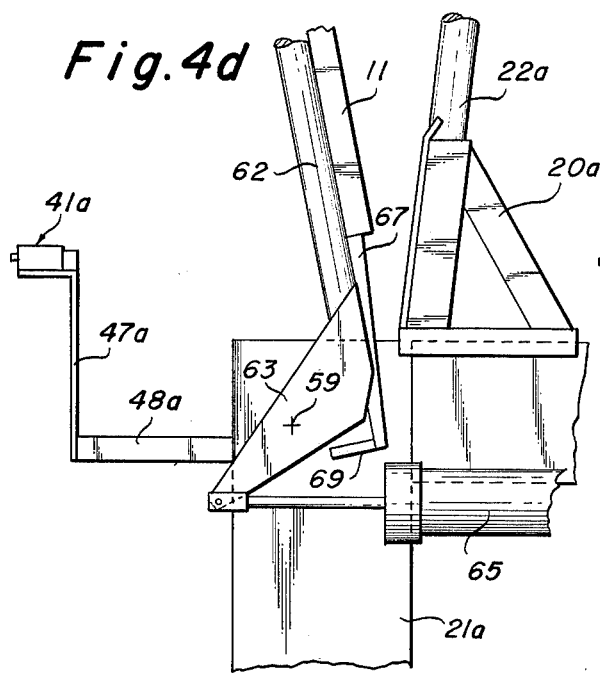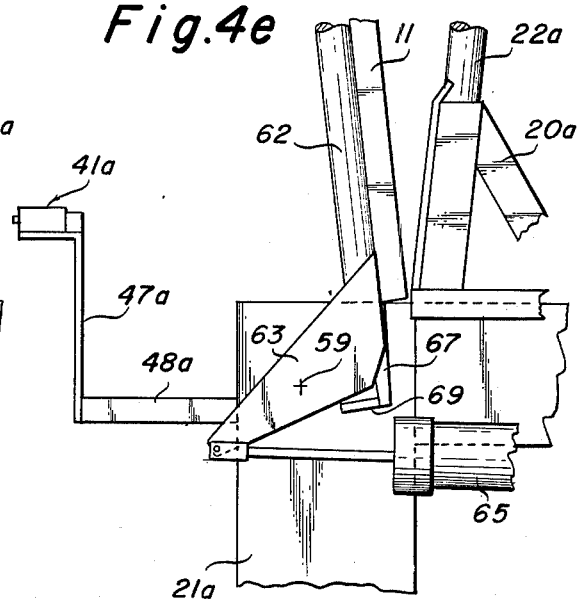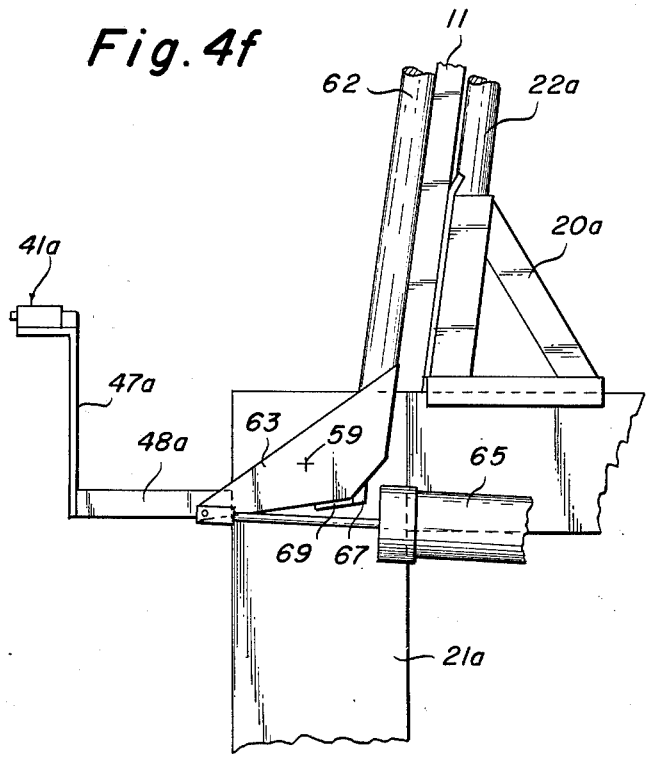

TRUSS STACKING APPARATUS

BACKGROUND OF THE INVENTION

1. Field of the Invention

This invention relates generally to handling equipment for wooden structural truss members, and more particularly to apparatus for raising horizontally disposed truss members off of a conveyor and for stacking the trusses in a generally upright position on a stacking skid.

2. Description of the Prior Art

Prefabricated wood building components, such as roof and floor trusses, are used extensively in the building industry today, particularly for residential construction. Normally, a roof truss includes an elongate base chord to which a plurality of angularly arranged top chords are attached. In one typical truss formation, the base chord is connected at each end with an angularly arranged top chord.

Such trusses are fabricated in varying shapes and sizes and similar trusses are then stored together prior to shipping. Typically, such trusses are fabricated at one station, and then successive ones of such trusses are horizontally disposed on a conveyor which transports them to a stacking station. At the stacking station, these trusses are successively lifted, either manually or automatically, to a generally upright position.

As evidenced by the patents to Adams U.S. Pat. No. 3,517,834 and Jureit et al. U.S. Pat. No. 3,811,578, various automatic stop and lift initiating devices have been proposed to properly position the truss on the conveyor for subsequent lifting with respect to the stacking station. In Jureit et al., a bumper plate-lift switch combination is disposed in the truss path on the conveyor downstream of the stacking station. A truss disposed on the conveyor is conveyed downstream with its base chord extending in the direction of movement of the conveyor. The downstream end of the truss abuts the bumper plate and activates the lift switch to effect lifting. If the truss has a tail, the tail end of the downstream and top chord will abut the bumper plate. If the truss has no tail, the truss portion where the downstream end top chord and base chord join will abut the bumper plate. If it is desired to stack smilarly sized ones of both types of trusses on the same skid, either the bumper plate or the stacking skid for receiving stacked trusses must be separately positioned for each type of truss stacked, or else the stacked trusses will be misaligned.

SUMMARY OF THE INVENTION

The present invention was developed to provide an improved stacking apparatus which includes means for positioning similarly sized trusses, both with and without tails, in a lifting position for stacking on a skid member. The stacking apparatus is so designed that the positioning means need not require separate adjustment when stacking similarly sized trusses with tails and without tails.

Accordingly, a primary object of the present inventions is to provide a stacking apparatus for stacking trusses of the type having a base chord and at least one top chord angularly arranged at an acute angle relative to the base chord, including a stacking station having a skid upon which said trusses are successively stacked in a generally vertical orientation upon their base chords, conveyor means for horizontally transporting successive trusses toward the stacking station, said trusses oriented on the conveyor with their base chords generally adjacent one side of the conveyor. Pivotable stacking arms are provided at the stacking station for raising successive trusses from the conveyor to a position above the stacking skid. The stacking arms are mounted for pivotal movement about an axis disposed on one side of the conveyor and generally parallel with the axis of the conveyor, said stacking arms being pivotable between a lowered position beneath the conveyor and an elevated position adjacent the stacking skid. Positioning means are provided for positioning successive trusses on the conveyor relative to the stacking arms prior to engagement thereby. The positioning means include a first stationary guide arranged in the path of travel of a truss approaching the stacking station to engage the top chord thereof and to laterally displace the truss relative to the conveyor in the direction of the pivot axis of the stacking arms. The positioning means further includes a second stationary guide arranged adjacent the stacking arms for engaging the base chord of the laterally displaced truss, which second guide cooperates with the first guide to orient the truss in a stacking position in which the truss base chord is parallel with and adjacent the stacking arm pivot axis. Consequently, when the truss is in its stacking position, the stacking arms may be operable to raise the horizontal truss from the conveyor to a generally vertical position relative to the stacking skid.

BRIEF DESCRIPTION OF THE DRAWING

FIG. 4a is an end elevation view of the stacking apparatus schematically shown in FIG. 1 prior to initiation of lifting; and FIGS. 4b–4f illustrate the relative orientation of the various parts of the stacking apparatus during a lifting operation.

DETAILED DESCRIPTION

Figure 1:
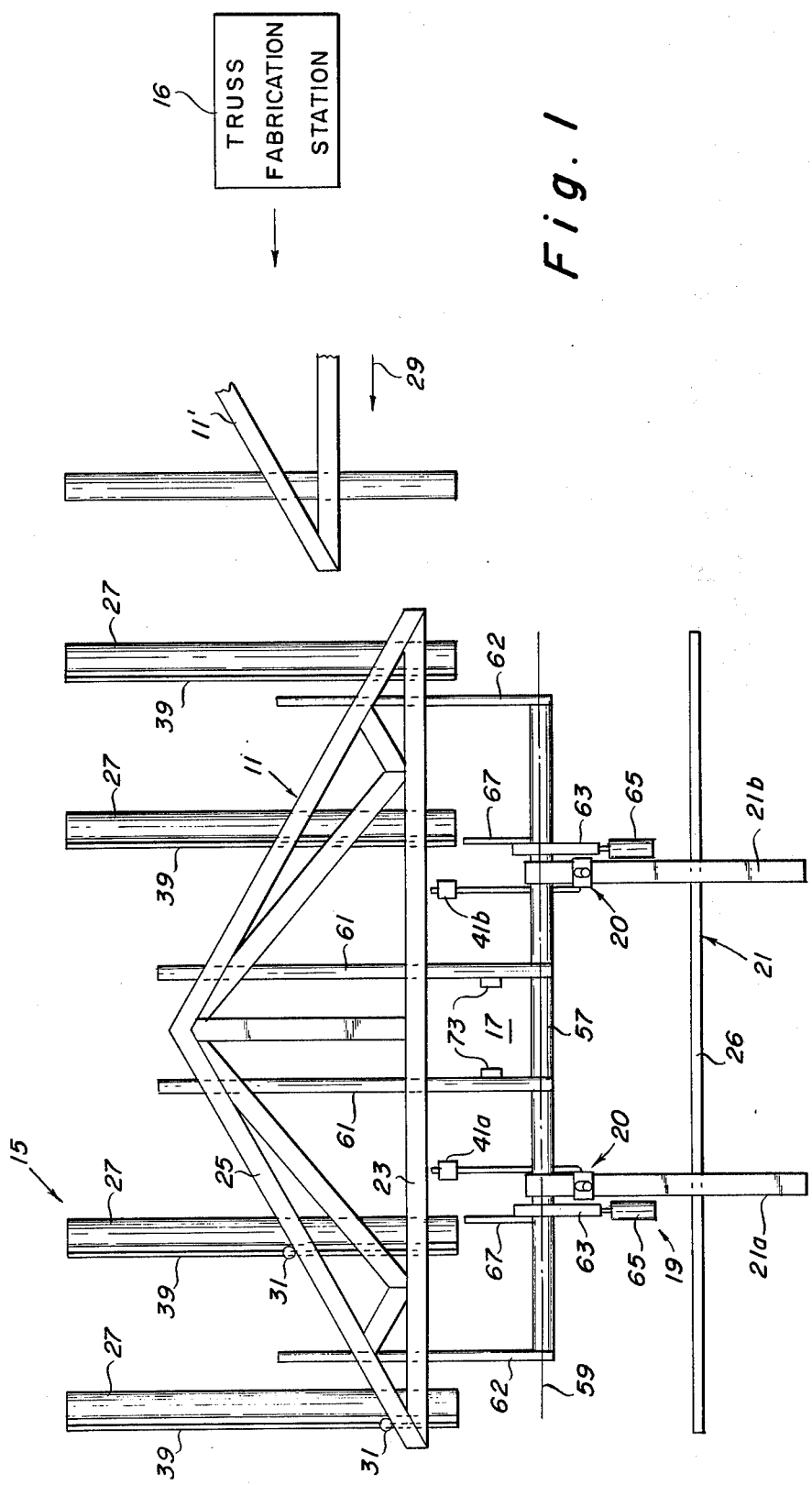
FIG. 1 is a schematic plan view of the stacking apparatus.
Figure 3:
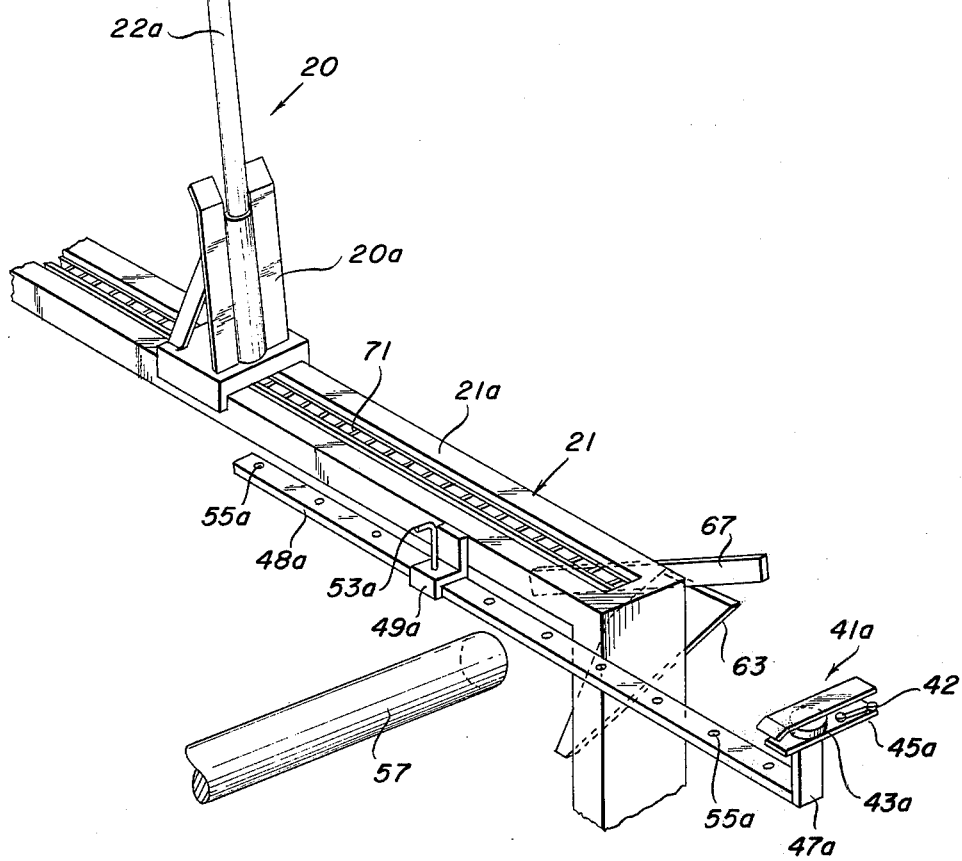
FIG. 3 is a detailed perspective view of one portion of the stacking apparatus illustrating the adjustable guide and switch means, and the truss retaining means.

Referring to FIG. 1, a successsion of trusses 11, 12 are horizontally conveyed by conveyor 15 from truss fabrication station 16 to a truss stacking station 17 where the trusses are successively positioned for stacking. A truss stacking apparatus 19 is disposed adjacent the conveyor 15 for engaging successive trusses positioned at the stacking station 17 and for lifting the trusses into a generally upright position against a backrest 20 (FIG. 3) disposed on a stacking skid or frame 21 forming part of the stacking apparatus 19. Frame 21 comprises a pair of spaced supports 21a, 21b which are disposed parallel to each other and generally normal to conveyor 15. The supports are connected by a crossbeam 26. Each of the supports 21a, 21b carries a backrest base portion 20a (FIG. 3) for linear movement thereon. Since the base portions are similar, only portion 20a is shown in FIG. 3. Base portion 20a receives a generally vertical post insert 22a, which is slightly inclined away from the conveyor 15 as shown in FIG. 4. Such a frame and backrest arrangement facilitates easy removal of trusses when such a frame has been fully loaded, since it is only necessary that the backrest inserts be removed, whereupon a forklift truck or similar vehicle can enter into the space between the supports 21a, 21b behind the cross-beam 26 immediately adjacent the stacked trusses. Consequently, the fork lift need only lift the trusses over the relatively short base portions 20a to remove the trusses from frame 21.

The trusses 11 which are to be stacked can assume many different forms. However, each type of such truss 11 will have an elongate base chord 23 and a plurality of top chords including a top chord arcuately arranged at an acute angle with respect to the downstream end of the base chord 23. This arcuately arranged top chord can, for example, take the form of end top chord 25 which is directly attached at an acute angle to the downstream end of the base chord 23.

In the illustrated embodiment, the conveyor 15 upon which trusses 11 are conveyed is in the form of a plurality of spaced, parallel rollers 27 conventionally mounted for rotation about their longitudinal axes. Some or all of the rollers may be power driven to provide automatic advance of the trusses. Each truss 11 is horizontally supported by the rollers 27 with its base chord 23 extending in a generally upstream-downstream direction. Each truss 11 is carried by the conveyor 15 in a direction generally indicated by the arrow 29.

Figure 2:
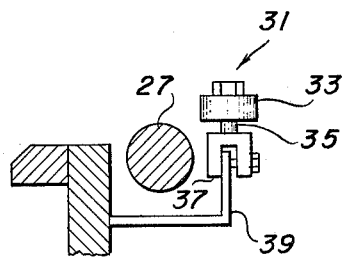
FIG. 2 is a detailed sectional view of an adjustable guide means disposed in the path of the conveyed truss.

In accordance with a characterizing feature of the invention, at least one end top chord guide member 31 is disposed in the path of the truss to engage the downstream end top chord 25 of truss 11. Each of the guide members 31 (shown in detail in FIG. 2) comprises a roller 33 mounted for rotation on a shaft 35 which itself is mounted on a support 37 mounted on a rail 39.

Truss 11, upon contacting the guide 31 while moving downstream along conveyor 15, is laterally deflected toward the stacking station 17 and the adjacent stacking apparatus 19 and into abutment with two or more similar base chord members 41a, 41b. The base chord guide members 41a, 41b are supported by the stacking apparatus 19 and are interposed between the laterally deflected, conveyor-supported truss and the stacking frame apparatus 19. Member 41a also includes a trigger switch 42 for actuating stacking apparatus 19, and is thereby distinguished from member 41b. Because of the similarity between members 41a, 41b, only member 41a will be described in detail. Member 41a (shown more clearly in FIG. 3) comprises a roller 43a mounted for rotation about a vertical axis relative to a horizontal baseplate 45a. Baseplate 45a is supported on a vertical flange 47a disposed at one end of an adjustable, elongate support 48a. A support guide 49a attached to the frame 21a slidably receives and horizontally supports the elongate support 48a. Support guide 49a carries a vertically disposed pin 53a which is insertable into any one of a series of spaced apertures 55a contained in the elongate portion 48a and selectively aligned with pin 53a. Such an arrangement of parts comprising each of the base chord guide members provides for linear positioning of the members 41a, 41b with respect to the conveyor-supported truss 11 which is deflected toward those members.

As mentioned above, member 41a is additionally provided with a conventional trigger mechanism 42 which is here shown disposed adjacent the roller 43a. When mechanism 42 is abutted by base chord 23, it activates the stacking apparatus 19 to lift the truss 11 positioned adjacent thereto.

The guide members 31 and the guide members 41a, 41b properly position truss 11 at stacking station 17 in a stacking position in which truss 11 simultaneously engages all the guide members. Since positioning is achieved by contacting the truss on its downstream end top chord 25 and on its base chord 23, it makes no difference whether or not the truss being loaded has a tail. Thus similarly sized trusses, with and without tails, may be loaded by a stacking apparatus 19 on the same skid 21 without changing the positioning of the guide members. To load differently sized trusses 11 on skid 21, it is necessary to reposition the guide members 31 and 41a, 41b.

The stacking apparatus 19 comprises a base arm 57 mounted in the frame 21 for rotation about an axis 59 disposed generally parallel to the base chord 23 of a truss 11 positioned in the stacking position. Intermediate its ends, the base arm 57 supports a pair of parallel, spaced lifting arms 61 mounted perpendicular to the axis 59. The arms 61 are swung by base arm 57 thru an arc between a lowered position in which the arms 61 extend between and beneath the upper surface of conveyor rolls 27 (see FIG. 4a), and a raised position in which the arms 61 assume either a generally vertical position or a position slightly over center towards the backrest 20 (see FIG. 4f).

The base arm 57 may optionally be provided with auxiliary lifting arms 62 disposed at its ends to aid in lifting larger trusses.

As shown in FIGS. 3 and 4a, the base arm 57 fixedly supports a rotatable cam 63 at both of its ends. Cam 63, which is rotatable about axis 59, is connected at one end to a conventional pressure cylinder 65 mounted to the frame 21. Actuation of cylinder 65 causes rotation of the cam 63 and supporting base arm 57 about axis 59, thereby moving the lifting arms 61 between their lowered and raised positions.

A truss retaining member 67 (shown clearly in FIGS. 4a–4f) is pivoted to each cam 63. The truss retaining member 67 engages a stationary, frame-mounted obstruction 69, its rotation will cease while the cam 63 and lifting arms 61 will continue to rotate. The truss retaining member 67 is arranged so that it extends above the cam 63 when the lifting arms 61 are in their lowered position. As the lifting arms are raised, the cam 63 and truss retaining member 67 rotate similarly while a truss 11 disposed on the arms 61 slides down the arms until its bottom chord 23 rests atop one end of the rotating member 67. Retaining member 67 stops rotating when it engages the obstruction 69 while the cam 63 and arms 61 keep rotating thereby, displacing truss 11 from member 67 and moving the same into upright position against backrest 20.

As noted above, the backrest 20, against which trusses 11 are stacked, is adapted to be movable. An individual truss in the process of being stacked on the skid 21 directly against the backrest 20 or against previously stacked trusses will be pushed onto the skid 21 by arms 61 causing any previously stacked trusses as well as the backrest to retreat by the thickness of the truss being stacked. To provide such retreat capability to the backrest, each backrest base portion is mounted to its respective frame support for linear movement along the length thereof. As seen in FIG. 3, the backrest support 20a sits atop the support 21a and engages a chain conveyor 71 disposed therein.

To assure that each truss will not be damaged as it is stacked on the frame 21, one or more push rollers 73

(shown schematically in FIG. 1) are employed which are disposed on the stacking arms. The push rollers are adapted to engage one surface of each truss coming off the truss retaining member, and to push that truss in the direction of the stacking skid. The advantage of using push rollers is that rolling contact is achieved between the truss and lifting arms which thus tends to reduce damage otherwise occurring as the truss slides past the lifting arm surface.

OPERATION

Figure 4B:
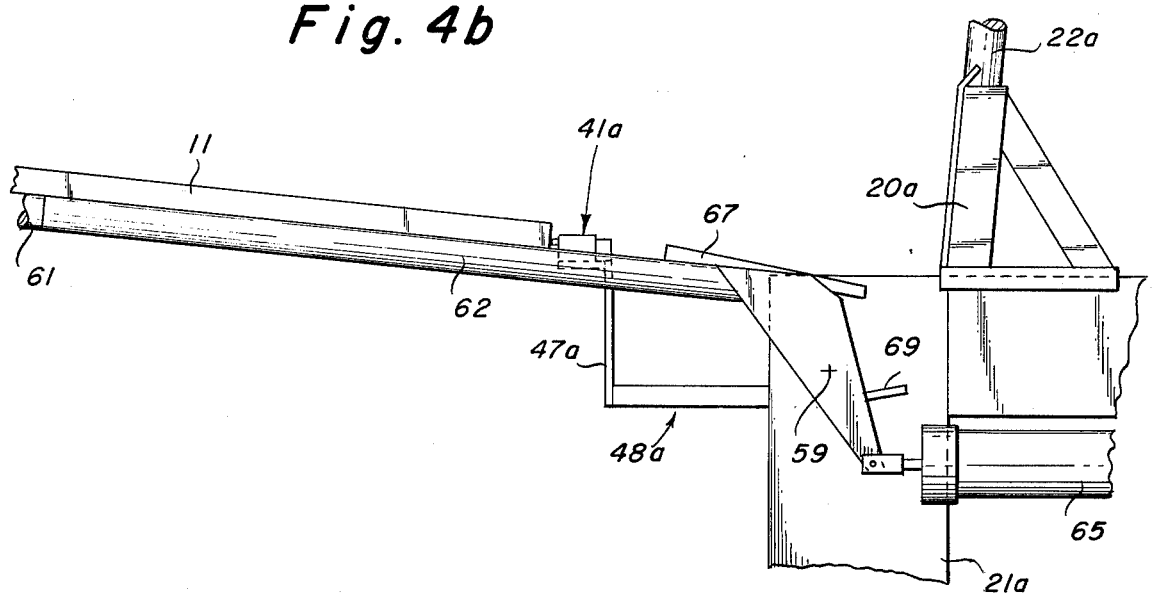

In operation, a truss 11 leaving the truss fabrication station 16 passes longitudinally down the conveyor 15 until its downstream end top chord 25 is intercepted by one or more of the guides 31. As the truss 11 continues to move downstream, it is also laterally deflected toward the stacking station 17 and the guides 41a, 41b. When the truss 11 has moved into the prearranged stacking position, it abuts the guides 41a, 41b and activates trigger switch 42 (FIG. 4a). Pressure cylinder 65 is actuated to effect rotation of cam 63, truss retaining member 67, and lifting arms 61 (FIG. 4b).

Figure 4C:
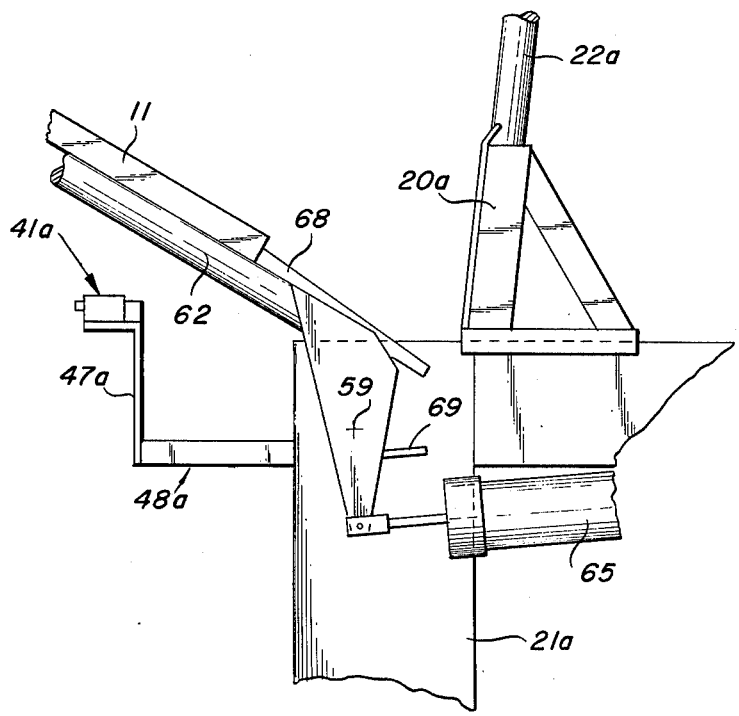

As the lifting arms 61 move upwardly from their lowered position, truss 11 slides down the now inclined lifting arms and is intercepted by the upraised end of truss retaining member 67 (FIG. 4c). While the cam 63 and lifting arms 61 continue rotation unabated, the truss retaining member 67 is intercepted by stationary obstruction 69 and stops rotating (FIG. 4d). As the lifting arms 61 continue rotating with the cam 63 and carry the truss past the now stationary truss retaining member 67, the truss is pushed over the end of the member 67 and down onto the skid 21 (FIG. 4e). The lifting arms 61 continue their rotation and push the truss 11 either against the retreating backrest or against already stacked trusses.

While in accordance with the provisions of the Patent Statutes the preferred form and embodiments of the invention have been illustrated and described, it will become apparent to those skilled in the art that various changes may be made without deviating from the inventive concepts set forth above.

What is claimed is:

1. In a stacking apparatus for stacking trusses of the type having a base chord and at least one top chord angularly arranged at an acute angle relative to the base chord, said apparatus including a stacking station having a skid upon which said trusses are successively stacked in a generally vertical orientation upon their base chords; conveyor means for horizontally transporting successive trusses toward said stacking station, said trusses being oriented on said conveyor means with their base chords generally adjacent one side of said conveyor means; and pivotable stacking arm means at said stacking station for raising successive trusses from said conveyor means to a position above said stacking skid, said stacking arm means mounted for pivotal movement, about an axis disposed on one side of the conveyor and generally parallel with the axis of the conveyor, between a lower position beneath the conveyor means and an elevated position adjacent said stacking skid; the improvement which comprises means for positioning successive trusses on the conveying means relative to the stacking arms prior to engagement thereby, said positioning means comprising
   a. first stationary guide means arranged in the path of travel of a truss approaching the stacking station to engage the top chord thereof and to laterally displace the truss relative to said conveyor means in the direction of said pivot axis of said stacking arm means; and
   b. second stationary guide means arranged adjacent said stacking arm means for engaging the base chord of the laterally displaced truss and cooperating with said first guide means to orient the truss in a stacking position in which the truss base chord is parallel with and adjacent said stacking arm pivot axis,
   whereby when said truss is in its stacking position said stacking arm means may be operable to raise the horizontal truss from the conveyor means to a generally vertical position relative to the stacking skid.

2. Apparatus as defined in claim 1, and further including
   a. power means for pivoting said stacking arms between their lowered and elevated positions; and
   b. switch means for activating said power means, said switch means being disposed adjacent said conveyor means and operated by a truss which is disposed in said stacking position.

3. Apparatus as defined in claim 1, and further including truss retaining means connected with said stacking arms for movement between truss-supporting and truss-releasing positions relative to said stacking arms, said truss retaining means being in the truss-supporting position only during the initial portion of the pivotal movement of said stacking arms from the lowered position toward the elevated position, said truss retaining means being operable to initially support and retain successive trusses being elevated on said stacking arms above said skid and out of interference with trusses previously stacked on said skid.

4. Apparatus as defined in claim 1, and further including push roller means mounted on said stacking arms for pushing each successive truss being deposited on said skid in a direction to move said truss and the trusses previously deposited on said skid away from said conveyor means by a distance equal to the thickness of the truss being deposited.

5. Apparatus as defined in claim 4, and further including backrest means connected with said skid for supporting in a generally upright position the trusses deposited on said skid, said backrest means being laterally displaceable away from said pivot axis as said push roller means pushes each truss deposited on said skid.

6. Apparatus as defined in claim 1, and further including means for laterally adjusting said second guide means relative to said conveyor means, whereby successive trusses being loaded may be of different sizes.

* * * * *